United States Patent [19]

Balzer et al.

[11] 4,078,360
[45] Mar. 14, 1978

[54] CUP LIDDING APPARATUS

[76] Inventors: Winton E. Balzer, 963 Central Ave., Needham, Mass. 02192; Kenneth M. Knobel, 37 Percy Rd., Lexington, Mass. 02173

[21] Appl. No.: 739,005

[22] Filed: Nov. 4, 1976

[51] Int. Cl.² ............................ B65B 57/02; B65B 7/28
[52] U.S. Cl. ............................................. 53/76; 53/296
[58] Field of Search .................... 53/296, 297, 298, 76

[56] References Cited

U.S. PATENT DOCUMENTS

| | | | |
|---|---|---|---|
| 3,345,797 | 10/1967 | Von Stoeser | 53/297 X |
| 3,501,896 | 3/1970 | Von Stoeser et al. | 53/296 X |
| 3,507,093 | 4/1970 | Marion | 53/296 X |
| 3,703,066 | 11/1972 | Marion et al. | 53/296 |
| 3,716,963 | 2/1973 | Amberg | 53/296 |

*Primary Examiner*—Travis S. McGehee
*Attorney, Agent, or Firm*—Morse, Altman, Oates & Bello

[57] ABSTRACT

Apparatus is provided for automatically lidding drinking cups with a film of thermoplastic sheet material. The apparatus includes a cup support adapted to raise a cup placed thereon into contact with a leading section of thermoplastic film drawn from a roll and to hold the cup while a reciprocating heated platen heat seals the film section against the cup rim. The cup support then lowers the lidded cup while a film advance mechanism draws out a fresh section of film into sealing position. A control system is included with the apparatus for operating the apparatus in predetermined timed sequence.

17 Claims, 8 Drawing Figures

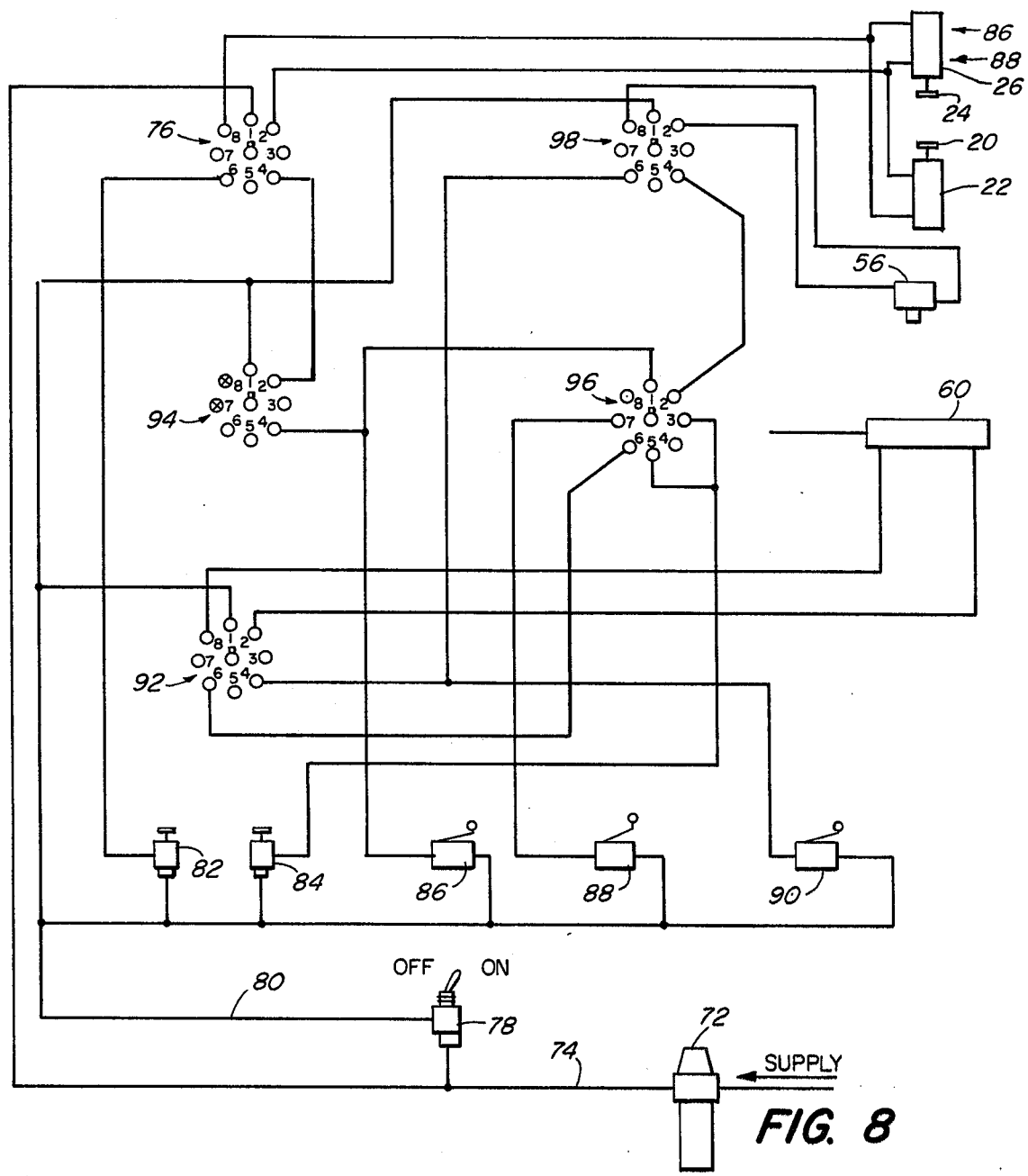
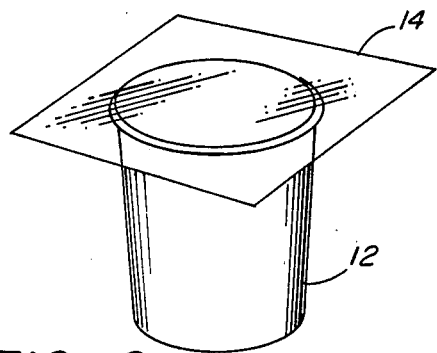
FIG. 6
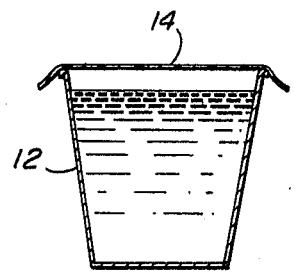
FIG. 7
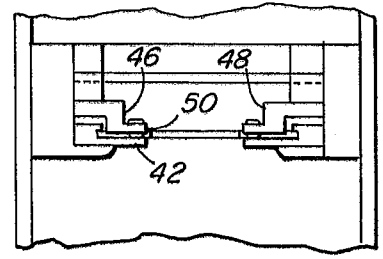
FIG. 5
FIG. 8

CUP LIDDING APPARATUS

BACKGROUND OF THE INVENTION

1. Field of the Invention

This invention relates generally to packaging machinery and more particularly is directed towards a new and improved apparatus for applying to a disposable drinking cup a lid of heat sealable film material.

2. Description of the Prior Art

Drinks purchased at take-out counters of restaurants, fast food shops, and the like, normally are sold in disposable cups with detachable lids to prevent spillage. The cups may be of cardboard, plastic, or a combination thereof, the construction of which depends largely on the drink to be contained therein, whether it be hot or cold. Typically, lids employed for cups of this type are individual discs pre-formed with a cooperating annular groove or flange which allows the lid to be pressed down tightly over the cup.

While lids of this type have been in use for many years, they have not been entirely satisfactory insofar as a different size lid must be provided for each cup size, rather than a single size lid for all sizes of cups. This creates inventory and storage problems, as well as requiring the operator to match the proper lid to the cup being filled. Furthermore, the application of the lid is a relatively time consuming operation which may create work problems, particularly when the point of sale is at a fast food counter. Also, the manual application of the lid over the top of the cup is rather unsanitary and results in unnecessary handling.

Accordingly, it is an object of the present invention to provide a new and improved apparatus for automatically applying a lid to a cup. Another object of this invention is to provide a novel apparatus for automatically applying a heat sealed plastic film lid to a prefilled disposable drinking cup. Still another object of this invention is to provide a simple, automatic apparatus for applying a low cost lid to a disposable drinking cup in a variety of different sizes.

SUMMARY OF THE INVENTION

This invention features an apparatus for heat sealing a thermoplastic film as a lid over the top of a drinking cup, comprising a cup holder adapted to raise and lower the cup to and from a section of thermoplastic film held by a film advance mechanism and a reciprocating heat sealing head adapted to move in and out of heat sealing engagement with the film over the cup lid. The head includes severing means for separating that section of film from a strip of film fed from a supply roll. The film advance mechanism is adapted to draw a fresh section of film from a roll of film into a cup-engaging position and control means are operatively connected to the cup holder, film advance mechanism and heat sealing head for operating the components in proper timed sequence.

BRIEF DESCRIPTION OF THE DRAWINGS

FIG. 5 is a detail front view of the film advance mechanism, FIG. 6 is a view in perspective of a cup with the lid applied by the invention, FIG. 7 is a sectional view in side elevation thereof, and, FIG. 8 is a schematic diagram of the control system.

DETAILED DESCRIPTION OF THE PREFERRED EMBODIMENT

Figure 1:
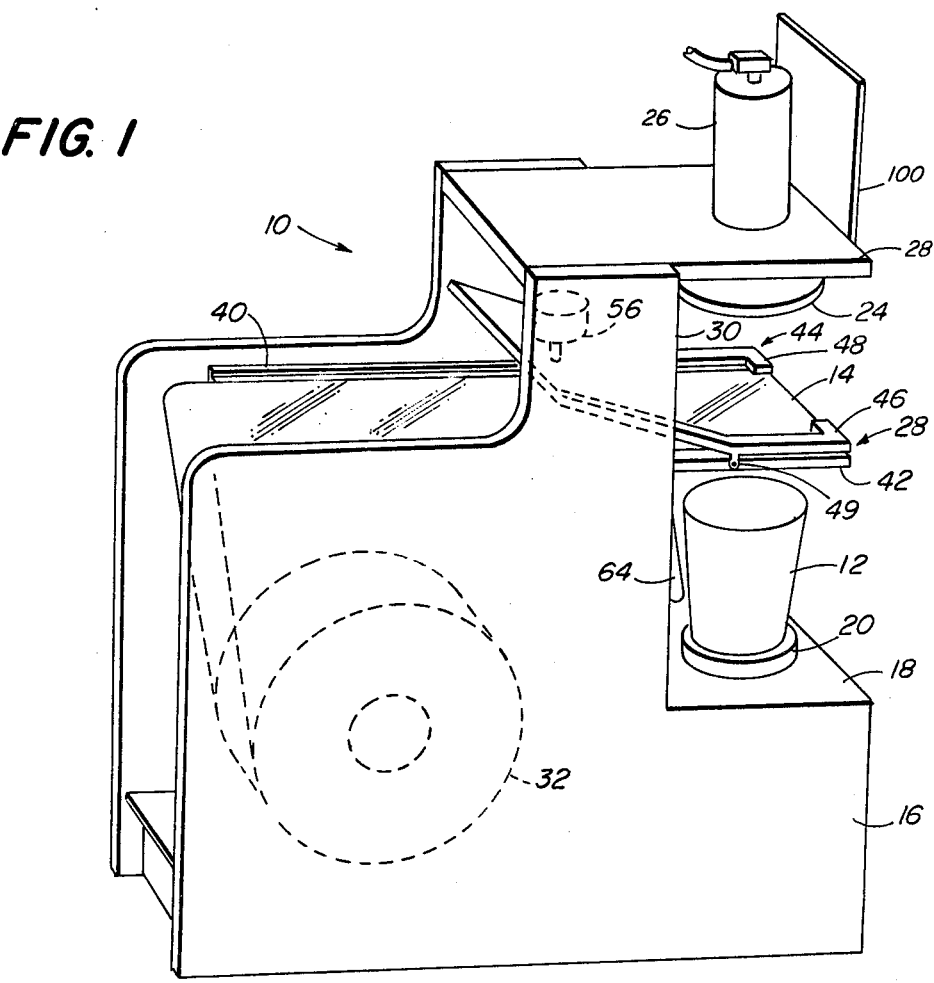
FIG. 1 is a view in perspective of an automatic cup lidding machine made according to the invention.
Figure 2:
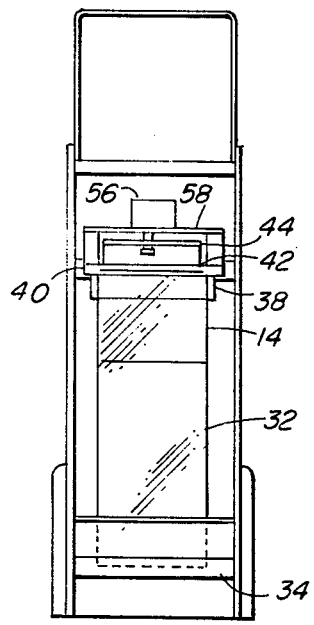
FIG. 2 is a view in rear elevation thereof.

Referring now to the drawings and to FIG. 1 in particular, the reference character 10 generally indicates an apparatus for automatically applying to a disposable drinking cup 12 or similar container a film lid 14 that is somewhat oversized to accommodate different cup sizes. The apparatus 10 is generally organized about a housing 16, preferably of relatively narrow front profile to minimize the frontal space required on a food counter which normally is quite crowded. The housing includes a front shelf 18 in which is disposed a cup holder 20 adapted to reciprocate vertically under the action of a pneumatic piston and cylinder 22 mounted within the housing below the shelf 18. The piston of the cylinder 22 has a relatively long and variable stroke and, when actuated, provides a continuous upward lifting pressure so that cups in a variety of different heights will all be raised sufficiently to bring their rims into contact with the film. Located directly above the cup support 20 is a relatively wide sealing head 24 adapted to reciprocate vertically along the same axis as the cup support 20 in order to heat seal the film 14 onto the rim of the cup 12 when the cup is in a raised position. The heat sealing head 24 is reciprocated by means of a pneumatic piston and cylinder 26 mounted to an overhanging shelf 28 near the top of the housing.

Disposed between the heat sealing head 24 and the cup support 20 is a film advance mechanism or carriage 28 adapted to reciprocate horizontally through a vertical front wall 30 of the housing in order to draw out a fresh section of lidding film provided in strip form and fed from a roll 32 of the film. The roll 32 is mounted within the housing and is supported by the rollers 34 and 36 forming a cradle, with the film being drawn from the roll upwardly, around an abutment 38 and horizontally forwards along a guideway 40. The leading end of the film is then engaged by the film advance mechanism which reciprocates in and out of the housing on each cycle of operation of the machine, drawing out a fresh section of film and holding it in position between the cup and the heat sealing head as the film is heat sealed onto the cup. The film advance mechanism then retracts, engages the leading edge of the film, and then draws out a new section of film into lidding position.

The film advance mechanism includes a relatively fixed lower jaw assembly 42 and a relatively moveable upper jaw assembly 44. The lower jaw assembly includes a pair of forwardly extending, spaced parallel arms with a flat L-shaped end portion which supports and engages the lower face and opposing corners of the free end of the film 14. The upper face of the film is gripped by the moveable upper jaw assembly 44 comprised of a pair of parallel rocker arms 46 and 48 extending directly above the arms of the lower frame assembly and terminating in L-shaped outer end portions, each end provided with a frictional pad 50. The rocker arms 46 and 48 are pivoted to the lower frame assembly at pivot points 49. The pad 50 may be of rubber or similar material adapted to grip firmly the top corners of the leading edge of the film, clamping the film tightly against the lower frame assembly 42 and defining with it a jaw mechanism which opens and closes in predetermined timed sequence.

As shown in the drawings, the jaws are in the extended, closed position holding the leading edge of the film extended and taut over the cup 12 in position prior to an operating cycle. The machine is cycled by placing the cup 12 on the cup support 20 and pushing against an actuating bar 52 preferably by the hand of the operator. The machine will then automatically cycle the cup support 20, first raising the cup up so that the rim of the cup will come up against the lower face of the film 14, while at the same time the heat sealing head 24 will come down against the top face of the film applying heat to the film at point of contact, with the cup causing the film to heat seal against the rim of the cup. In the same stroke, a heated wire 54, located rearwardly of the sealing head 24 and moveable with it, severs that section of film which has been heat sealed to the cup from the strip of film. When that operation has been completed, the head 24 retracts, the cup support 20 drops, and the film advancement opens its jaws by pivoting the rocker arms 46 and 48 as it retracts inwardly.

Figure 3:
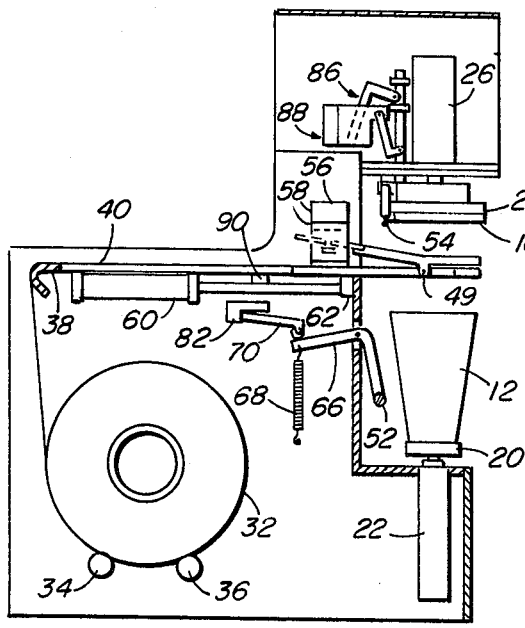
FIG. 3 is a sectional view in side elevation of the apparatus.
Figure 4:
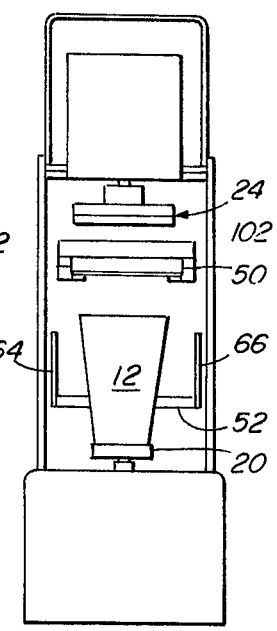
FIG. 4 is a view in front elevation thereof.

The rocker arm movement is controlled by means of a small pneumatic piston and cylinder 56 mounted to the film advance mechanism and moveable with it. The piston and cylinder assembly 56 engages the inner ends of the rocker arms 46 and 48 which extend diagonally upwards and to the rear, as best shown in FIGS. 1 and 3. The piston and cylinder 56 are mounted to a transverse frame 58 which rigidly connects the arms of the lower frame assembly 42 to form a carriage moveable along the guideway 40 by means of a pneumatic piston and cylinder 60 mounted horizontally below the guideway and connected to the film advance mechanism by means of a union 62. When the film advance mechanism retracts, the piston and cylinder 56 is actuated to bias the rocker arms, opening the jaws of the mechanism, and, when the mechanism reaches its extreme left-hand position, the jaws are closed so that the leading edge of the film will be gripped tightly at both leading corners. The film advance mechanism then moves forwardly, drawing with it a fresh section of film.

The push bar 52, which initiates the cycling of the machine, is connected to a pair of L-shaped arms 64 and 66 pivoted to the front wall 30 of the housing and the inner end of the arms is biased downwardly by means of a coil spring 68. The inner end of the arms also engages an actuator 70 which starts the machine through its cycle.

As best shown in FIG. 8, the control system of the apparatus is pneumatically operated with compressed air provided by a suitable source 72. Compressed air from the source 72 is fed by a conduit 74 to an air logic module 76 and also to an on-off valve 78, which, by means of a conduit 80, connects to a cycle start valve 82, a feed valve 84 and limit valves 86, 88 and 90, all of which interconnect with other air logic modules 92, 94, 96 and 98. The various valves and air logic modules are interconnected with the several piston and cylinder units 22, 26, 56 and 60 to cycle the apparatus in proper operating sequence. The limit valves 86 and 88 are located adjacent to the piston and cylinder 26 which raises and lowers the heat sealing head 24. The limit valve 90 is mounted proximate to the guideway 40 to control the operation of the piston and cylinder 60 which moves the film advance carriage back and forth. The starter valve 82 is mounted in position to be operated by the arm 70 and responds to actuation of the push bar 52 when a cup is placed on the cup holder 20 and the bar is pressed by the operator. The feed valve 84 is mounted on a front control panel 100 and allows the film advance mechanism to be cycled independently of the operation of the other portions of the system so as to allow film from a fresh roll to be fed into a starting position. Similarly, the off-on valve 78 is also mounted on the control panel 100 as are other controls, such as heating controls for the heat sealing head 24 which may employ a rheostat, or the like (not shown).

The air logic module 76 primarily controls the operation of the cup holder cylinder 22 and the heating pad cylinder 26, while the module 92 primarily controls the film advance cylinder 60. The module 98 primarily controls the opening and closing of the gripper jaws of the film advance mechanism through the piston and cylinder 56, while the module 94 provides an appropriate delay required for proper operation of this system.

The heat sealing head 24 preferably is provided with a heat resistant, soft pad 102 on its lower face so that the pad will conform to the rim of the cup when the head presses the film 14 down against the rim of the cup during a heat sealing operation. This provides a greater area of contact between the film and the cup, producing a better seal between the film and the cup than would be the case with a simple line contact. The cup itself may be fabricated from a variety of materials, such as cardboard, plastic-coated cardboard, foam plastic, plastic, or other materials. The film employed is a thermoplastic material and a polyester film, which is laminated with a heat sealing coating on one face thereof, has been found satisfactory. Other materials that may be used to advantage include paper, foil and other plastic film all coated with a heat sealing material or a heat sealable unlaminated film.

The apparatus is extremely simple to operate and all that need be done by the operator is to fill the cup 12 with whatever drink the customer has ordered. The operator then places the filled cup 12 on the cup holder 20, pushing it inwardly so as to depress the bar 52. Once this is done the machine cycles by itself, causing the cup holder 20 to raise the cup 12 against the prepositioned film 14. At the same time the heat sealing head comes down to press the film against the rim of the cup, sealing the film against the cup rim. The head then retracts and the cup is lowered while the film advance mechanism cycles to draw out a fresh section of film for the next lidding operation. During the heat sealing operation, the section of film over the cup is severed from the film supply by means of the heated wire 54 producing the rectangular section of film shown in FIG. 6 which serves as the lid for the cup. Once the cup has been lowered, the operator may remove the cup and deliver it to the customer. The seal is sufficiently tight so that the cup may be inverted without its contents leaking, and the film has sufficient strength to prevent bursting thereof. The lid may be removed by the customer by simply gripping a corner or edge of the film and pulling in over the cup in a peeling action. Insofar as the film is somewhat oversize, a wide variety of cup sizes may be employed with the apparatus without adjustment. The film may be heat sealed to a wide range of cup sizes insofar as the heat sealing head is relatively wide and circular and will engage and properly seal film to a variety of different sizes of cups. Since the cup lifting mechanism has a relatively long stroke and will provide continuous raising pressure when actuated, cups of different heights can be accommodated.

While the invention has been described with particular reference to the illustrated embodiment, numerous modifications thereto will appear to those skilled in the art. For example, instead of a pneumatic system to operate the film feed mechanism, cup lift and heat sealing head, other power means may be used, such as a hydraulic system or a gear system driven by electric motors or a combination thereof. Also, while the invention is particularly suited to cup lidding application, it may also be used to advantage in lidding other open top containers of different configurations. Further, while the film advance mechanism has been described as gripping the leading edge of the film, this could be modified to grip the edges of the film as a means to advancing it.

Having thus described the invention, what we claim and desire to obtain by Letters Patent of the United States is:

1. Apparatus for heat sealing a section of heat sealable film over the top of a cup, or the like, comprising
   (a) a cup holder adapted to reciprocate along a vertical axis,
   (b) a heat sealing and film severing head mounted in spaced relation above said holder and adapted to reciprocate substantially along said axis, said head including a relatively wide resilient heating pad on the lower face thereof,
   (c) a film advance mechanism mounted for movement in a horizontal plane between said holder and said head for drawing from a roll a leading section of film across said axis in position between said holder and head,
   (d) control means operatively connected to said holder head and mechanism for raising said holder and a cup thereon upwardly against the lower face of said film section, lowering said head against the upper face of said film section to heat seal said film section to the rim of said cup and sever said section from said roll, then lowering said holder and cup, raising said head and actuating said mechanism to draw a fresh section of film into position,
   (e) said film advance mechanism including a carriage mounted for horizontal reciprocation from a retracted to an extended position,
   (f) said carriage including pivotally connected upper and lower jaws, and,
   (g) jaw actuating means adapted to pivot at least one of said jaws to open and close said jaws against said film in response to said control means whereby said jaws are closed while holding a section of film extended over said cup and open when said carriage retracts along the feed path of said film, said jaws then closing to grip the leading edge of said film as said carriage extends to draw out a fresh section of film.

2. Apparatus, according to claim 1, including control actuating means proximate to said holder for initiating an operating cycle of said control means.

3. Apparatus, according to claim 1, wherein said head includes a heating wire in position to sever said section of film from said roll as said film section is heat sealed to said cup.

4. Apparatus, according to claim 1, including guide means for guiding film from said roll towards said film advance mechanism, said guide means including a track for slidably supporting and guiding said mechanism along a path parallel to the face of said film.

5. Apparatus, according to claim 2, wherein said control actuating means is a pivoted bar mounted above and behind said cup support.

6. Apparatus, according to claim 1, wherein said control means is pneumatic.

7. Apparatus, according to claim 1, wherein said film advance mechanism is selectively operable independent of and in sequence with said holder and said head.

8. Apparatus, according to claim 1, wherein said control means is adapted to move said cap holder over a variable distance along said axis and provide continuous upward pressure thereon, when actuated, whereby cups of different heights may be sealed with film.

9. Apparatus for heat sealing a section of heat sealable film over the top of a cup, or the like, comprising
   (a) a cup holder adapted to reciprocate along a vertical axis,
   (b) a heat sealing and film severing head mounted in spaced relation above said holder and adapted to reciprocate substantially along said axis,
   (c) a film advance mechanism mounted for movement in a horizontal plane between said holder and said head for drawing from a roll a leading section of film across said axis in position between said holder and head,
   (d) control means operatively connected to said holder head and mechanism for raising said holder and a cup thereon upwardly against the lower face of said film section, lowering said head against the upper face of said film section to heat seal said film section to the rim of said cup and sever said section from said roll, then lowering said holder and cup, raising said head and actuating said mechanism to draw a fresh section of film into position,
   (e) said film advance mechanism including a carriage mounted for horizontal reciprocation from a retracted to an extended position,
   (f) said carriage including jaws and jaw actuating means adapted to open and close said jaws against said film in response to said control means whereby said jaws are closed while holding a section of film extended over said cup and open when said carriage retracts along the feed path of said film, said jaws then closing to grip the leading edge of said film as said carriage extends to draw out a fresh section of film,
   (g) said carriage including a relatively fixed lower jaw assembly and a relatively movable upper jaw assembly, each assembly being formed with a pair of parallel arms extending forwardly of said carriage parallel to the side edges of said film,
   (h) said upper jaw assembly being pivotally connected to said lower jaw assembly whereby biasing movement applied at one end of said upper jaw assembly will open and close said jaws selectively, and,
   (i) means for biasing said upper jaw assembly.

10. Apparatus, according to claim 9, including control actuating means proximate to said holder for initiating an operating cycle of said control means.

11. Apparatus, according to claim 9, wherein said head includes a heating wire in position to sever said section of film from said roll as said film section is heat sealed to said cup.

12. Apparatus, according to claim 9, wherein said head includes a relatively wide resilient heating pad on the lower face thereof.

13. Apparatus, according to claim 9, including guide means for guiding film from said roll towards said film advance mechanism, said guide means including a track for slidably supporting and guiding said mechanism along a path parallel to the face of said film.

14. Apparatus, according to claim 10, wherein said control actuating means is a pivoted bar mounted above and behind said cup support.

15. Apparatus, according to claim 9, wherein said control means is pneumatic.

16. Apparatus, according to claim 9, wherein said film advance mechanism is selectively operable independent of and in sequence with said holder and said head.

17. Apparatus, according to claim 9, wherein said control means is adapted to move said cap holder over a variable distance along said axis and provide continuous upward pressure thereon, when actuated, whereby cups of different heights may be sealed with film.

* * * * *